(12) United States Patent
Klappert

(10) Patent No.: US 11,051,068 B2
(45) Date of Patent: *Jun. 29, 2021

(54) METHODS AND SYSTEMS FOR VERIFYING MEDIA GUIDANCE DATA

(71) Applicant: Rovi Guides, Inc., San Jose, CA (US)

(72) Inventor: Walter R. Klappert, Los Angeles, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,750

(22) Filed: Dec. 11, 2017

(65) Prior Publication Data

US 2018/0199099 A1      Jul. 12, 2018

Related U.S. Application Data

(63) Continuation of application No. 14/579,529, filed on Dec. 22, 2014, now Pat. No. 9,843,835.

(51) Int. Cl.
  *H04N 21/436*  (2011.01)
  *H04N 21/44*   (2011.01)
  *H04N 21/462*  (2011.01)
  *H04N 21/482*  (2011.01)

(52) U.S. Cl.
  CPC . *H04N 21/43615* (2013.01); *H04N 21/44008* (2013.01); *H04N 21/4622* (2013.01); *H04N 21/4821* (2013.01)

(58) Field of Classification Search
  CPC .................................................. H04N 21/8358
  See application file for complete search history.

(56) References Cited

U.S. PATENT DOCUMENTS

| | | | | |
|---|---|---|---|---|
| 9,854,306 | B2 * | 12/2017 | Wordley | H04N 21/454 |
| 2002/0059623 | A1 * | 5/2002 | Rodriguez | H04N 5/44543 |
| | | | | 725/91 |
| 2004/0117831 | A1 * | 6/2004 | Ellis | H04N 5/44543 |
| | | | | 725/53 |
| 2006/0015897 | A1 * | 1/2006 | Kim | H04N 5/445 |
| | | | | 725/33 |
| 2006/0179469 | A1 * | 8/2006 | Fransman | H04N 7/17327 |
| | | | | 725/115 |
| 2008/0256575 | A1 * | 10/2008 | Raju | H04L 63/08 |
| | | | | 725/39 |
| 2009/0234889 | A1 * | 9/2009 | Dupree | H04H 60/33 |
| 2014/0130099 | A1 * | 5/2014 | Kunisetty | H04N 21/4667 |
| | | | | 725/50 |
| 2016/0094877 | A1 * | 3/2016 | Heffernan | H04N 21/44008 |
| | | | | 725/19 |

* cited by examiner

*Primary Examiner* — Fernando Alcon
(74) *Attorney, Agent, or Firm* — Haley Guiliano LLP

(57) ABSTRACT

Methods and systems are disclosed herein for verifying media guidance data. Specifically, a media guidance application may facilitate the extraction and transmission of an excerpt of a media asset that is associated with media guidance data such that the content of the excerpt may be compared to content known to be associated with the media guidance data.

22 Claims, 4 Drawing Sheets

METHODS AND SYSTEMS FOR VERIFYING MEDIA GUIDANCE DATA

CROSS-REFERENCE TO RELATED APPLICATION

This application is a continuation application of U.S. patent application Ser. No. 14/579,529, filed Dec. 22, 2014 (now pending), the disclosure of which is hereby incorporated by reference herein in its entirety.

BACKGROUND

In conventional systems, users often use an interactive guide to access media content (e.g., broadcast television, movies, on-demand content, etc.). For example, the interactive guide may allow users to see available titles and/or the scheduled availability of media content. Invariably, the interactive guide may feature data that is out-of-date or otherwise incorrect. However, providers of media guidance data used to populate the interactive guide may have few means to detect and verify the data appearing in an interactive guide.

SUMMARY

Accordingly, methods and systems are disclosed herein for verifying media guidance data. Specifically, a media guidance application may facilitate the extraction and transmission of an excerpt of a media asset that is associated with media guidance data such that the content of the excerpt may be compared to content known to be associated with the media guidance data. For example, an interactive guide may list a particular television program as currently appearing to a user. To verify that the media asset actually shown to the user is the particular television program, the media guidance application may extract a screenshot of the media asset that is currently appearing to a user. The media guidance application may then determine the content (e.g., names, characters, etc.) in the screenshot and compare the content to content (e.g., names, characters, etc.) known to be associated with the particular television program. Upon determining that the content in the screenshot does not correspond to the content known to be associated with the particular television program, the media guidance application may cause alternative media guidance data to appear in the interactive guide.

In some aspects, the media guidance application may transmit, from a first device (e.g., a server), a media asset (e.g., a television program) for display on a second device (e.g., a set-top box, tablet computer, etc.). For example, a media guidance data source or the provider of an interactive guide may transmit one or more television programs, movies, etc. The media guidance application may also transmit, from the first device, a media guidance datum for display on the second device. For example, the media guidance data source or the provider of an interactive guide may transmit a title, summary, scheduling information, etc., about the media asset.

The media guidance application may also receive an indication that the media guidance datum generated for display on the second device does not correspond to the media asset generated for display on the second device. For example, the media guidance application may receive a user input (e.g., corresponding to the selection of an icon appearing on the first or second device) requesting that the media guidance application verify the media guidance datum or a user input that otherwise reports a problem. In another example, the media guidance application may receive indications continuously or periodically as part of normal housekeeping procedures.

In response to receiving the indication, the media guidance application may determine, at the first device, whether a portion of data (e.g., audio and/or video data for the media asset) extracted from the media asset generated for display on the second device corresponds to media content corresponding to the media guidance datum generated for display on the second device. For example, in response to the indication, the media guidance application may request or extract a portion (e.g., a frame, a scene, etc.) of the media asset generated for display on the screen device.

The media guidance application may then compare the portion of data extracted from the media asset generated for display on the second device to other content to determine whether the portion corresponds to the media content corresponding to the media guidance datum generated for display on the second device. For example, the media guidance application may determine whether the portion corresponds to the media content by cross-referencing the portion (e.g., a scene of the media asset generated for display on the second device) with a database of portions (e.g., scenes) of the media content to determine whether the portion matches one of the portions. In another example, the media guidance application may determine whether the portion corresponds to the media content by identifying an object (e.g., a name, character, vehicle, etc.) in the portion and comparing the object to objects corresponding to the media content.

In some embodiments, the media guidance application may transmit an updated media guidance datum for display on the second device in response to determining that the portion does not correspond to the media content. For example, in response to determining that the portion does not correspond to the media content corresponding to the media guidance datum generated for display on the second device, the media guidance application may=transmit new media guidance data that does correspond to the portion.

In some embodiments, the media guidance application may request an additional portion of data extracted from the media asset generated for display on the second device in response to determining that the portion does not correspond to the media content. For example, in response to determining that the portion does not correspond to the media content corresponding to the media guidance datum generated for display on the second device, the media guidance application may extract additional portions and determine whether or not those portions correspond to the media content corresponding to the media guidance datum generated for display on the second device.

In some embodiments, the media guidance application may transmit a verification message in response to determining that the portion does correspond to the media content. For example, in response to determining that the portion does correspond to the media content corresponding to the media guidance datum generated for display on the second device, the media guidance application may notify the user that the media guidance datum is correct.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
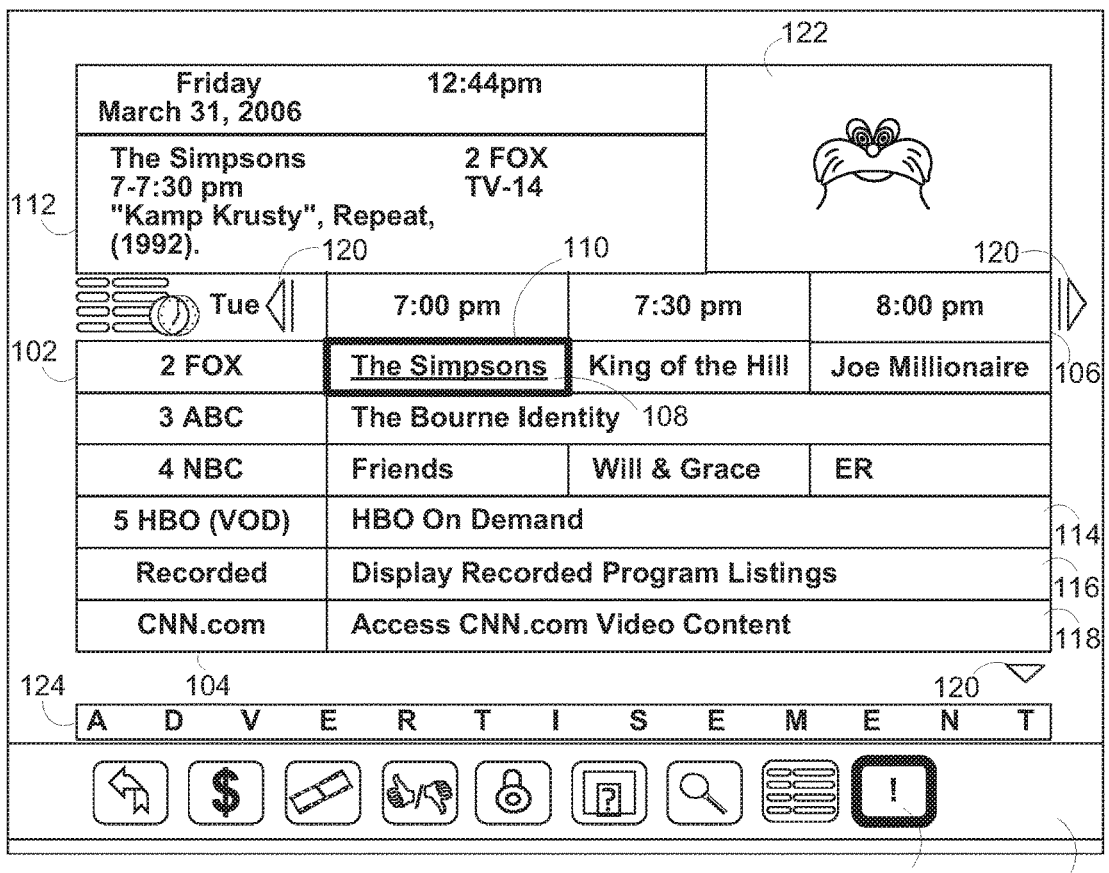
FIG. 1 shows an illustrative example of a display screen generated by a media guidance application that features an on-screen icon for verifying media guidance data in accordance with some embodiments of the disclosure.

Methods and systems are disclosed herein for verifying media guidance data. Specifically, a media guidance application may facilitate the extraction and transmission of an excerpt of a media asset that is associated with media guidance data such that the content of the excerpt may be compared to content known to be associated with the media guidance data.

As referred to herein, a "media guidance application" is an application that provides media guidance data to a user through an interface. For example, a media guidance application may allow users to efficiently navigate content selections and easily identify content that they may desire. The media guidance application and/or any instructions for performing any of the embodiments discussed herein may be encoded on any computer readable medium. Computer readable media include any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media cards, register memory, processor caches, Random Access Memory ("RAM"), etc.

Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Media guidance applications may generate graphical user interface screens that enable a user to navigate among, locate and select content.

The media guidance application discussed herein may facilitate the extraction and transmission of an excerpt of a media asset. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

For example, the media guidance application may extract a portion of the media asset. As referred to herein, a "portion" is any segment or other portioning of a media asset. For example, a portion may correspond to any scene, chapter, clip, frame, etc. of a media asset. In some embodiments, the portion may correspond to a segment of the media asset that is viewable and/or otherwise presented to a user during playback of a media asset. For example, a portion of the media asset that is viewable and/or otherwise presented to the user during playback may include audio or video data of the media asset. This may be contrasted with data that is not viewable and/or otherwise presented to the user during playback of the media asset such as metadata or media guidance data associated with the media asset.

For example, a portion of the media asset that is viewable and/or otherwise presented to the user during playback may include audio or video data of the media asset that is generated for presentation on a user device. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, the media guidance application may compare a portion of the media asset, as transmitted by a provider of the media asset, to media guidance data, also as transmitted by a provider of the media asset. For example, a media guidance data source or the provider of an interactive guide may transmit, from a remote server, one or more television programs, movies, etc., for display on a user device. The media guidance application may also transmit, from the remote server, a media guidance datum for display on the user device.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

For example, the media guidance data source or the provider of an interactive guide may transmit information about a media asset such that the user may identify and determine whether or not he or she wishes to consume the media asset. In some cases, the media guidance data source of the provider of the interactive guide may transmit out-of-date or otherwise incorrect information (e.g., information that does not correctly identify and/or describe a media asset to which it is supposed to correspond). For example, a media guidance application may present a media guidance datum that identifies a first television show appearing at 7 PM. However, when the user selects the first television show, the media asset presented may not be the first television show, but instead may be a second television show. In such cases, the media asset datum may not correspond to the media asset.

Media guidance data may become out-of-date or otherwise incorrect in a variety of ways. For example, media assets presented before a media asset in question may have overrun their scheduled broadcast times. In such cases, the media asset in question may no longer correspond to the media guidance datum (e.g., listing a scheduled broadcast time). Accordingly, the media guidance application may facilitate the transmission of data between a device (e.g., a set-top box) used to generate for display the media asset and media guidance datum and a device that transmitted, provided, and/or is capable of correcting (e.g., a head-end server) the media guidance datum.

In some embodiments, the media guidance application may periodically or continuously verify media guidance data. For example, the media guidance application may continually compare transmitted media assets to transmitted media guidance data to determine that the media asset that is transmitted actually corresponds to the media guidance datum that was transmitted. In some embodiments, the media guidance application may perform this verification process without any human interaction. Alternatively or additionally, the media guidance application may query the user to determine whether or not to verify the media guidance data and/or provide an option (e.g., via selection of an on-screen icon) to verify media guidance data.

To verify that a media guidance datum associated with a media asset actually corresponds to the media asset, the media guidance application may facilitate the extraction and transmission of an excerpt of a media asset that is associated with media guidance data such that the content of the excerpt may be compared to content known to be associated with the media guidance data. For example, an interactive guide may list a particular television program as currently appearing on a television channel. To verify that the media asset actually shown to the user is the particular television program, the media guidance application may extract copy a portion of the media asset as is currently appearing and/or being transmitted on the television channel. For example, the media guidance application may perform a print screen operation, record one or more frames of the media asset, or otherwise capture a portion of the media asset. The media guidance application may then compare the captured portion of data to data that is known to be associated with the listed television program.

For example, the media guidance application may determine an object in the captured portion of the media asset. As referred to herein, an "object" is any human consumable attribute presented to a user during playback of the media asset. For example, an object may refer to a character, vehicle, location, and/or any other item or entity that appears in the media asset. In another example, an object may represent a song, tone, spoken word, or other audio output corresponding to the media asset. In yet another example, an object may represent a word displayed onscreen in a media asset, a word in a subtitle, a word in closed captioning information, etc.

To identify an object in a media asset, the media guidance application may incorporate and/or have access to a content recognition module capable of using object recognition techniques such as edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique to monitor the appearance (or lack thereof) of one or more users and/or user devices. For example, the media application may receive data in the form of a video (e.g., a television program). The video may include a series of frames. For one or more of the frames of the video, the media application may use a content recognition module or algorithm to detect one or more objects in the one or more frames.

In some embodiments, the content recognition module or algorithm may also include speech recognition techniques, including but not limited to Hidden Markov Models, dynamic time warping, and/or neural networks (as described above) to translate spoken words, sounds, or other audio data into text. For example, the content recognition module may listen for sounds that constitute an object or sounds that indicate an object is appearing in a media asset (e.g., a spoken word naming a character in the media asset).

In addition, the media application may use multiple types of optical character recognition and/or fuzzy logic, for example, when processing keyword(s) retrieved from data (e.g., textual data, translated audio data, user inputs, etc.). For example, the media guidance application may analyze text appearing in the media asset, subtitles, and/or closed captioning information. The media guidance application may further use a search function and/or fuzzy logic. For example, using fuzzy logic, the media application (e.g., via a content recognition module or algorithm incorporated into, or accessible by, the media application) may determine two fields and/or values to be identical even though the substance of the data or value (e.g., two different spellings of a potential destination) is not identical.

Upon determining that a particular object is included in a media asset, the media guidance application may determine whether or not the particular object is associated with a media asset that corresponds to the transmitted media guidance datum. For example, in response to determining that a movie includes a character, the media guidance application may determine whether or not that character corresponds to a media asset associated with the transmitted media guidance datum.

For example, the media guidance application may determine whether a portion of data extracted from the media asset actually generated for display on a user device corresponds to the media content associated with a media asset corresponding to the media guidance data. To do so, the media guidance application may cross-reference a portion (e.g., a scene of the media asset generated for display on the second device) or an object (e.g., a character appearing in the portion) with a database of portions (or objects) of the media content to determine whether the portion (or object) matches one of the portions (or objects).

In some embodiments, data regarding the content of a media asset (e.g., chrominance, luma, or other image values of pixels in a frame of a media asset) may be transmitted with a media asset (e.g., as metadata) and received by the media guidance application implemented on a user equipment device. In some embodiments, the data may be generated by a media guidance application, either on local or remote equipment, by processing the pixels of each frame of the media asset. For example, the media guidance application may include content recognition modules as discussed above such that the media guidance application may receive an input of an image (e.g., a frame of a media asset) and output a set of characteristics related to the image. The media guidance application may use any standard image and/or signal processing techniques.

In some embodiments, image processing may include one or more samplings at a time. As used herein, a "sampling" may include one or more pixels or frames. For example, a sampling may include a group of pixels (e.g., that define a distinct region of the frame or an object on the frame) or a group of frames (e.g., that define a predetermined number of frames or a particular scene of a media asset). It should be noted that as used in the context of image processing throughout this disclosure systems and methods described in relation to samples of pixels may also be applied to, for example, single-color regions (e.g., subpixels) or any other input used by an image sensor to convert an optical image into an electronic signal or vice versa. Furthermore, the use of pels, bytes, bits, dots, spots, etc., which in some context may be synonymous with samples or pixels is also contemplated by this disclosure. In addition, throughout this disclosure the term "frame" should be understood to apply to conventional film frames, video frames, and/or digital frames and such frames should be understood to include the still images, when shown in series, that make up a media asset.

For example, after identifying an object (e.g., a vehicle) appearing in a transmitted media asset, the media guidance application may input the object (or a sampling associated with a location of the object) into a database listing objects (or samplings) appearing in media content corresponding to a transmitted media guidance datum. The database may determine whether or not any database entry matches the inputted object. If so, the media guidance application may verify that the transmitted media asset corresponds to the transmitted media guidance datum. If not, the media guidance application may not verify that the transmitted media asset corresponds to the transmitted media guidance datum.

Figure 2:
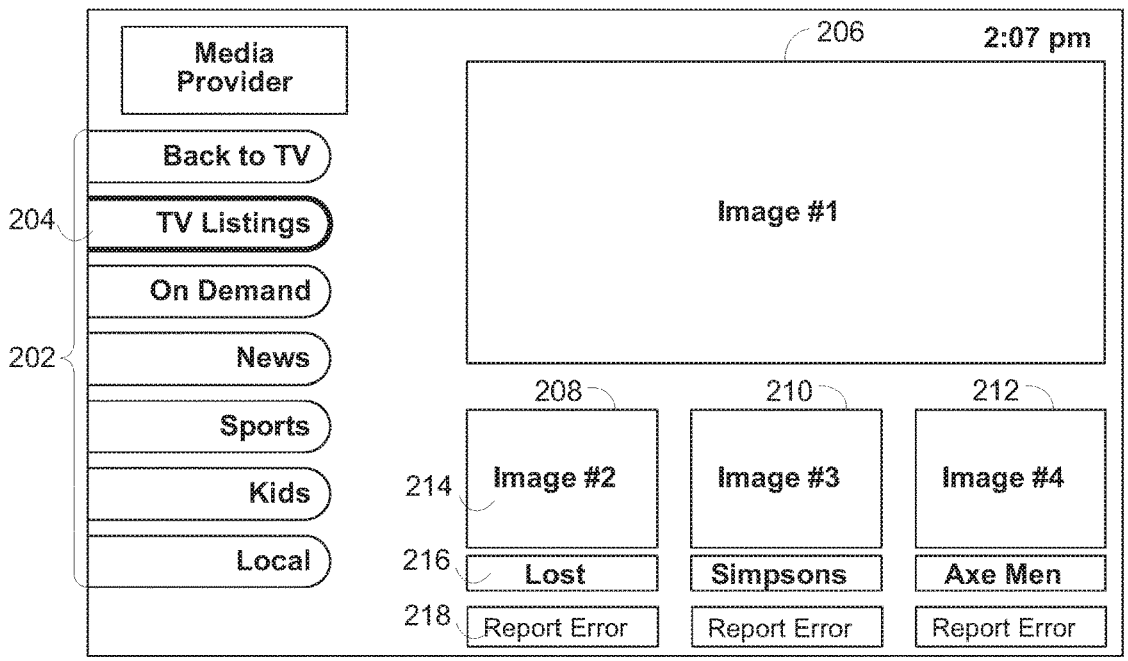
FIG. 2 shows another illustrative example of a display screen generated by a media guidance application that features an on-screen icon for verifying media guidance data in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided as media guidance datum 112. Media guidance datum 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include media asset 122, advertisement 124, and options region 126. Media asset 122 may correspond to highlight region 110. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

Options region 126 also includes icon 128. For example, in response to a user selecting icon 128, the media guidance application may verify whether or not a currently generated for display media asset (e.g., media asset 122) corresponds to a currently generated for display media guidance datum (e.g., media guidance datum 112). Alternatively or additionally, in response to a user selecting icon 128, the media guidance application may verify whether or not a transmitted media asset corresponds to transmitted media guidance datum whether or not the actual media asset is generated for display. For example, in response to receiving a user selection of 128, the media guidance application may verify all media guidance data or a subset of media guidance data (e.g., the media guidance data on-screen, the media guidance data corresponding to media content that is currently available (e.g., on-demand, previously recorded, and currently broadcasted media assets), etc.).

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

Additionally, one or more of the listings may be associated with an on-screen icon (e.g., icon 218), the selection of which allows a user to report incorrect or out-of-date media guidance data associated with the listing. For example, in response to a user selection of icon 218, the media guidance application may verify image portion 214 and/or text portion 216 of listing 208. For example, the media guidance application may compare the media asset that is actually transmitted when listing 208 is selected to media content that is known to be associated with image portion 214 and/or text portion 216 to determine whether or not the media guidance data for listing 208 is incorrect or out-of-date.

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
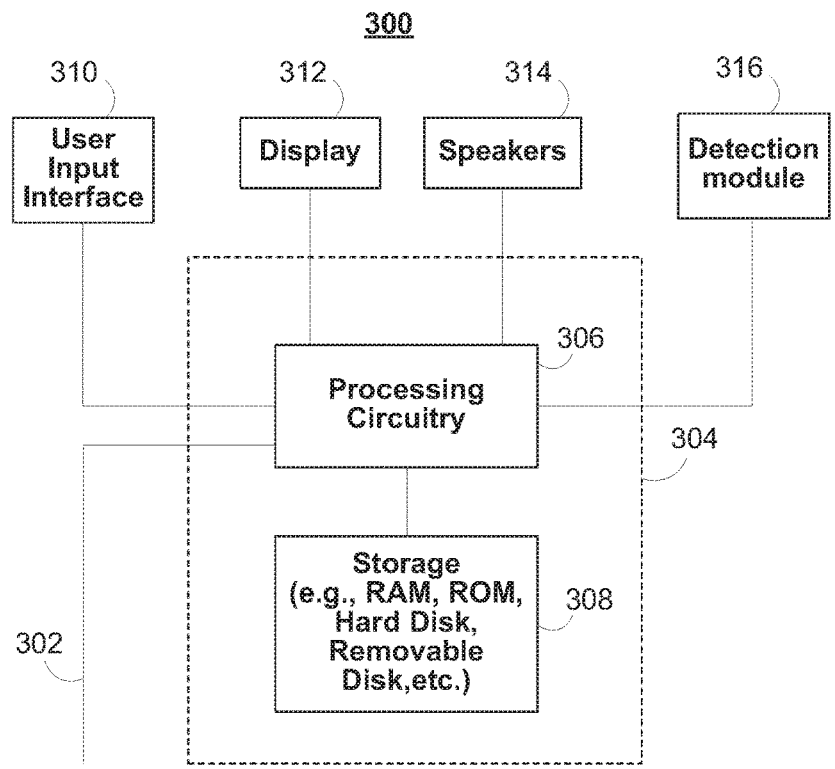
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
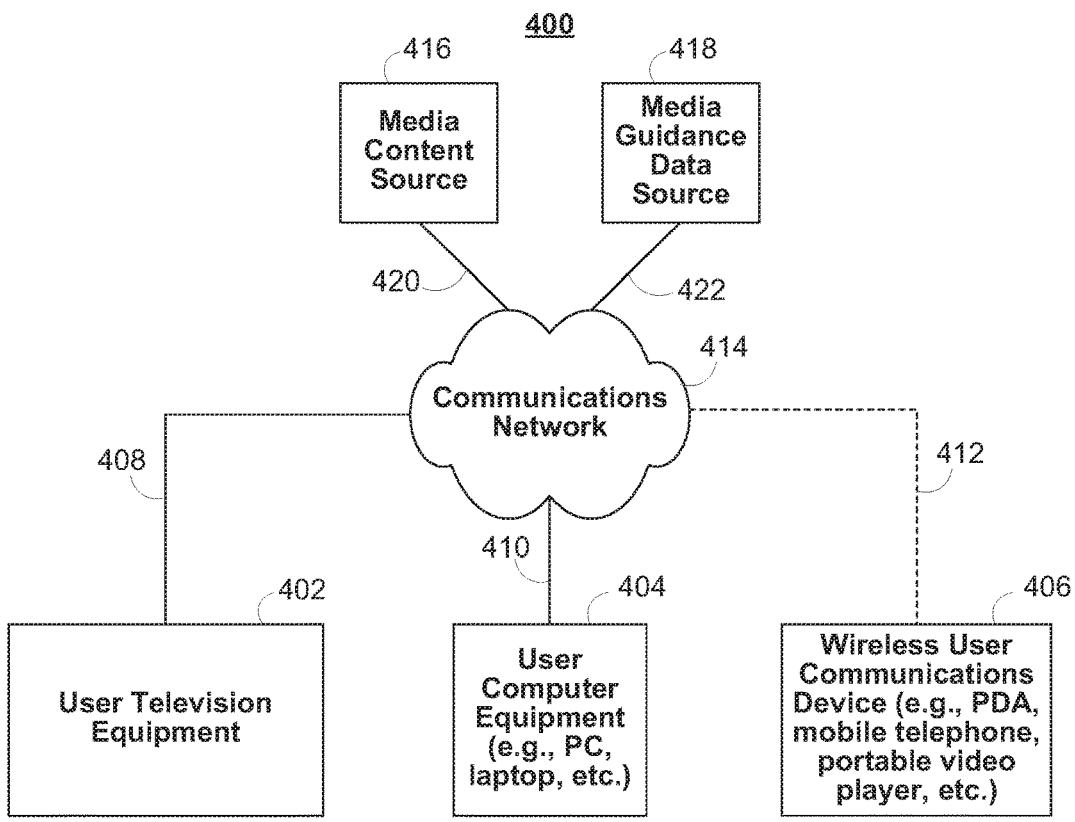
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired).

Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412.

Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
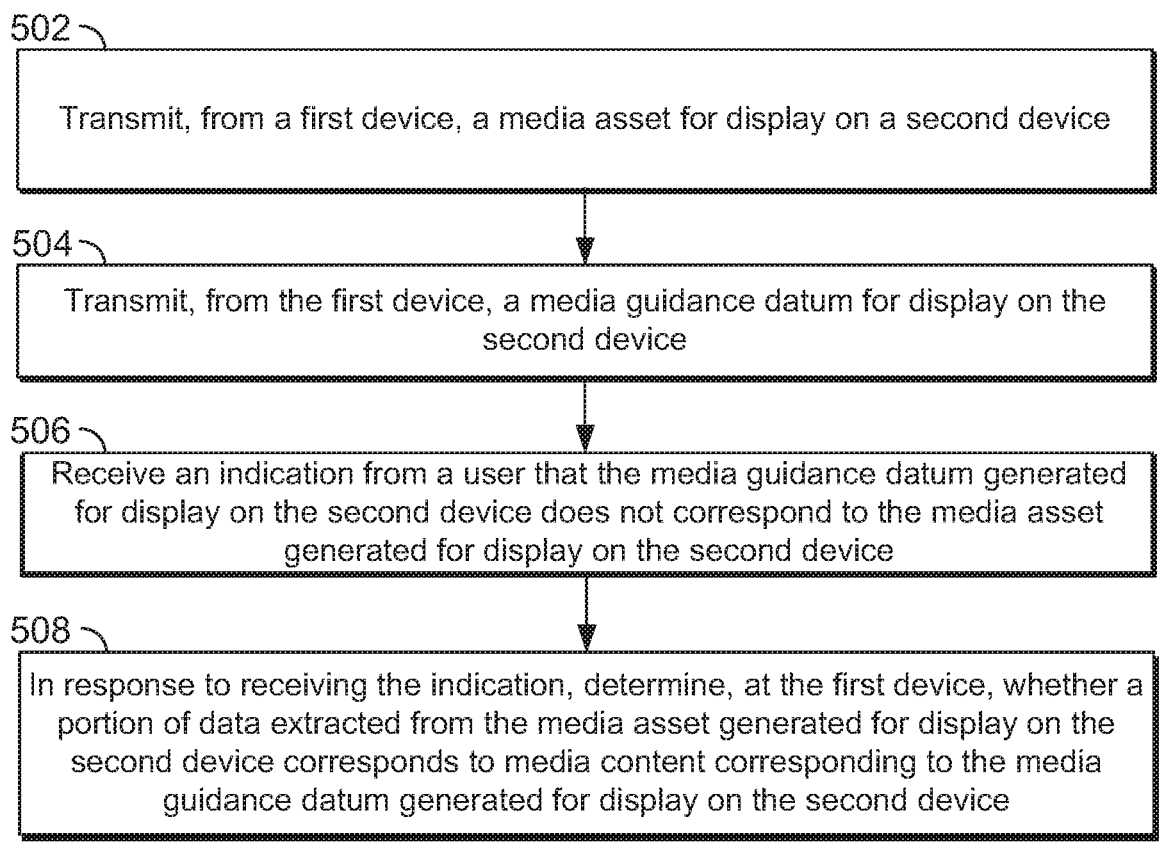
FIG. 5 is a flowchart of illustrative steps for determining whether or not a portion of data extracted from a media asset corresponds to a particular media asset in accordance with some embodiments of the disclosure.

FIG. 5 is a flowchart of illustrative steps for determining whether or not a portion of data extracted from a media asset corresponds to a particular media asset. It should be noted that process 500 or any step thereof could be performed on, or provided by, any of the devices shown in FIGS. 3-4. For example, process 500 may be executed by control circuitry 304 (FIG. 3) as instructed by a media guidance application implemented on user equipment 402, 404, and/or 406 (FIG. 4) in order to determine whether or not a portion of data extracted from a media asset corresponds to a particular media asset. In addition, one or more steps of process 500 may be incorporated into or combined with one or more steps of any other process or embodiment (e.g., process 600 (FIG. 6)).

At step 502, the media guidance application (e.g., via control circuitry 304 (FIG. 3)) transmits, from a first device (e.g., media content source 416 or media guidance data source (FIG. 4)), a media asset (e.g., media asset 122 (FIG. 1)) for display on a second device (e.g., user equipment device 402, 404, and/or 406 (FIG. 4)). For example, a media guidance data source or the provider of an interactive guide may transmit one or more television programs, movies, etc. At step 504, the media guidance application (e.g., via control circuitry 304 (FIG. 3)) transmits, from the first device (e.g., media content source 416 or media guidance data source (FIG. 4)), a media guidance datum (e.g., media guidance datum 112 (FIG. 1)) for display on the second device. For example, the media guidance data source or the provider of an interactive guide may transmit a title, summary, scheduling information, etc., about the media asset. In some embodiments, the media asset and the media guidance datum may be transmitted from different sources. For example, the media asset may be transmitted from media content source 416 (FIG. 4), while the media guidance datum is transmitted from media guidance data source 418 (FIG. 4).

At step 506, the media guidance application receives (e.g., via user input interface 310 (FIG. 3)) an indication (e.g., a user selection of icon 128 (FIG. 1)) that the media guidance datum generated for display on the second device (e.g., user equipment device 402, 404, and/or 406 (FIG. 4)) does not correspond to the media asset (e.g., media asset 122 (FIG. 1)) generated for display on the second device. For example, the media guidance application may receive a user input requesting that the media guidance application verify the media guidance datum or a user input that otherwise reports a problem. In another example, the media guidance application may receive indications continuously or periodically as part of normal housekeeping procedures.

At step 508, the media guidance application (e.g., via control circuitry 304 (FIG. 3)) determines, at the first device (e.g., media content source 416 (FIG. 4)), whether or not a portion of data (e.g., audio and/or video data for the media asset) extracted from the media asset (e.g., media asset 122 (FIG. 1)) generated for display on the second device (e.g., user equipment device 402, 404, and/or 406 (FIG. 4)) corresponds to media content corresponding to the media guidance datum (e.g., media guidance datum 112 (FIG. 1)) generated for display on the second device (e.g., user equipment device 402, 404, and/or 406 (FIG. 4)) in response to receiving the indication. For example, in response to the indication, the media guidance application may request or extract a portion (e.g., a frame, a scene, etc.) of the media asset generated for display on the screen device.

The media guidance application may (e.g., via control circuitry 304 (FIG. 3)) compare the portion of data extracted from the media asset (e.g., media asset 122 (FIG. 1)) generated for display on the second device (e.g., user equipment device 402, 404, and/or 406 (FIG. 4)) to other content to determine whether the portion corresponds to the media content corresponding to the media guidance datum (e.g., media guidance datum 112 (FIG. 1)) generated for display on the second device. For example, the media guidance application may determine whether the portion corresponds to the media content by cross-referencing the portion (e.g., a scene of the media asset generated for display on the second device) with a database (e.g., located at storage 308 (FIG. 3) and/or any location accessible via communications network 414 (FIG. 4)) of portions (e.g., scenes) of the media content to determine whether the portion matches one of the portions. In another example, the media guidance application may determine whether the portion corresponds to the media content by identifying an object (e.g., a name, character, vehicle, etc.) in the portion and comparing the object to objects corresponding to the media content.

In some embodiments, the media guidance application may (e.g., via control circuitry 304 (FIG. 3)) transmit an updated media guidance datum for display on the second device in response to determining that the portion does not correspond to the media content. For example, in response to determining that the portion does not correspond to the media content corresponding to the media guidance datum generated for display on the second device, the media guidance application may transmit new media guidance data that does correspond to the portion.

In some embodiments, the media guidance application may (e.g., via control circuitry 304 (FIG. 3)) request an additional portion of data extracted from the media asset generated for display on the second device in response to (e.g., via control circuitry 304 (FIG. 3)) determining that the portion does not correspond to the media content. For example, in response to determining that the portion does not correspond to the media content corresponding to the media guidance datum generated for display on the second device, the media guidance application may extract additional portions and determine whether or not those portions correspond to the media content corresponding to the media guidance datum generated for display on the second device.

In some embodiments, the media guidance application may (e.g., via control circuitry 304 (FIG. 3)) transmit an award to a user in response to (e.g., via control circuitry 304 (FIG. 3)) determining that the portion does not correspond to the media content. For example, if the media guidance data received from a first source is incorrect, the media guidance application may reward the user that reported the problem.

In some embodiments, the media guidance application may (e.g., via control circuitry 304 (FIG. 3)) transmit a verification message in response to determining that the portion does correspond to the media content. For example, in response to determining that the portion does correspond to the media content corresponding to the media guidance datum generated for display on the second device, the media guidance application may notify the user that the media guidance datum is correct.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 5.

Figure 6:
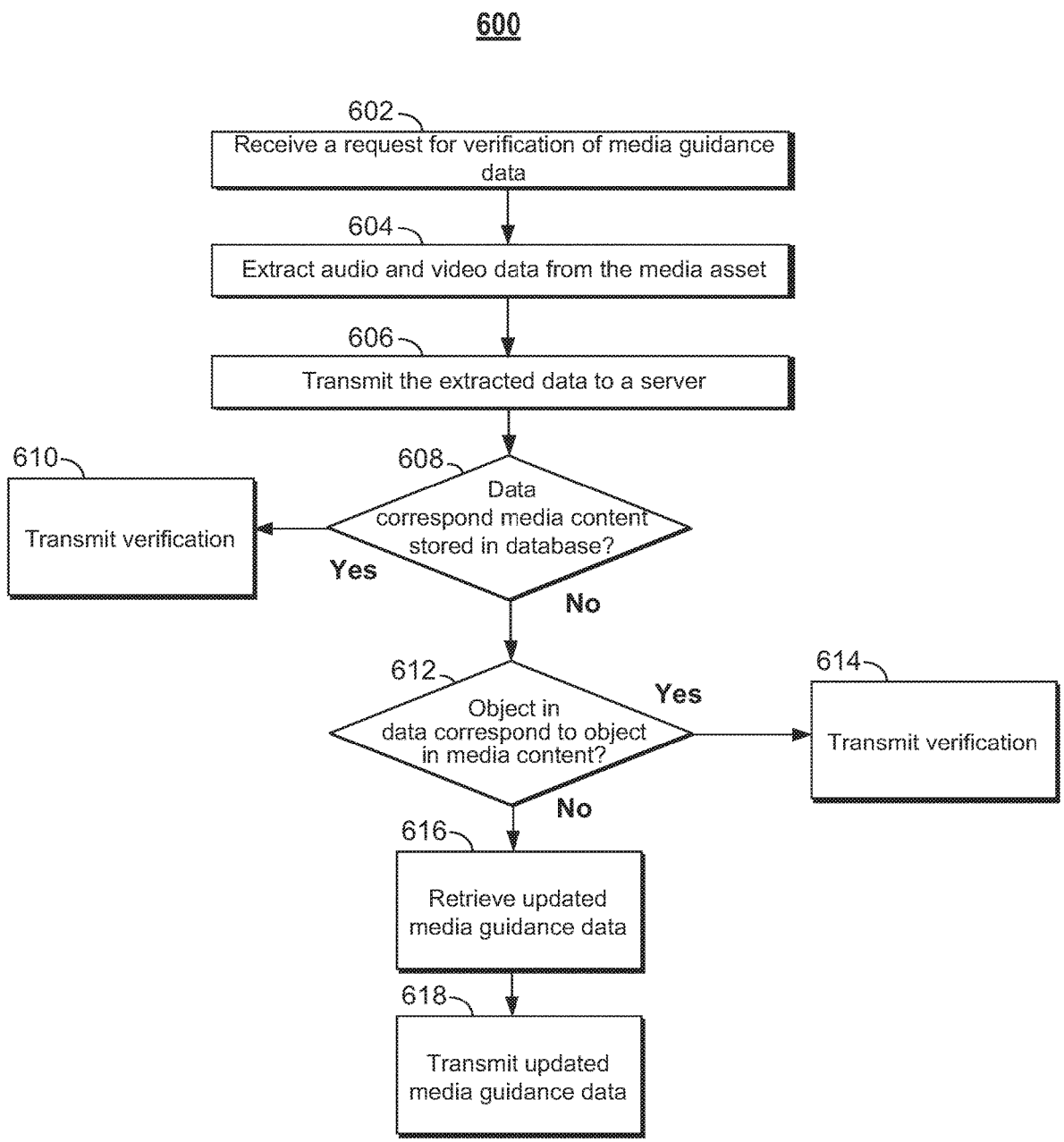
FIG. 6 is a flowchart of illustrative steps for determining whether or not to transmit a verification in accordance with some embodiments of the disclosure.

FIG. 6 is a flowchart of illustrative steps for determining whether or not to transmit a verification. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to determine whether or not to transmit a verification. In addition, one or more steps of process 600 may be incorporated into or combined with one or more steps of any other process or embodiment (e.g., process 500 (FIG. 5)).

At step 602, the media guidance application (e.g., via control circuitry 304 (FIG. 3)) receives a request for verification of media guidance data. For example, the media guidance application may have received a user selection (e.g., via user input interface 310 (FIG. 3)) of icon 128 (FIG. 1). In another example, the media guidance application may have (e.g., via control circuitry 304 (FIG. 3)) automatically determined to verify the media guidance data (e.g., as part of a housekeeping routine).

At step 604, the media guidance application (e.g., via control circuitry 304 (FIG. 3)) extracts audio and video data from the media asset. For example, the media guidance application may (e.g., via control circuitry 304 (FIG. 3)) select, or may issue instructions to the user device to select, a portion of the media asset that is currently being transmitted to and/or played back on the user device (e.g., user equipment device 402, 404, and/or 406 (FIG. 4)). For example, the media guidance application may select one or more frames that where broadcasted when the request was received.

Alternatively, the media guidance application may select portions of the media asset from various points in the run-time of the media asset. For example, by selecting portions from various portions of the media asset, the media guidance application may avoid a situation in which a single portion of the media asset features different content (e.g., different objects) than other portions. For example, if the media guidance application selects many portions, the media guidance application may (e.g., via control circuitry 304 (FIG. 3)) analyze each of the portions. If one portion is found not to correspond with the others (e.g., the portion corresponds to a commercial transmitted with the media asset), the media guidance application may rely on objects found in the other portions.

Accordingly, it should be noted that in some embodiments, the media guidance application may (e.g., via control circuitry 304 (FIG. 3)) extract one or more portions of audio and video data from various points in the media asset. Likewise, the media guidance application may analyze multiple portions and/or objects extracted from the media asset. In some embodiments, the extraction of multiple portions and/or objects may be done in a series of iterations. While in some embodiments, the extraction of multiple portions and/or objects may be done simultaneously.

At step 606, the media guidance application (e.g., via control circuitry 304 (FIG. 3)) transmits the extracted data to a server. For example, the media guidance application may (e.g., via control circuitry 304 (FIG. 3)) issue instructions to a user device requesting that extracted data be sent to a remote device. For example, in some embodiments, the media guidance application may control and/or issue instructions (e.g., via I/O path 302 (FIG. 3)) to multiple devices. Accordingly, the media guidance application may divide the analysis of a portion of extracted content between the multiple devices. For example, while the user device may select and/or extract a portion of the media asset, a remote device (e.g., a head-end server) may perform the analysis on the extracted portion.

At step 608, the media guidance application (e.g., via control circuitry 304 (FIG. 3)) determines whether the extracted data corresponds to media content stored in a database (e.g., located at storage 308 (FIG. 3) and/or any location accessible via communications network 414 (FIG. 4)). For example, as explained above, the media guidance application may (e.g., via control circuitry 304 (FIG. 3)) compare the portion of data extracted from the media asset (e.g., media asset 122 (FIG. 1)) to other content to (e.g., via control circuitry 304 (FIG. 3)) determine whether the extracted data corresponds to the media content corresponding to the media guidance data (e.g., media guidance datum 112 (FIG. 1)). For example, the media guidance application may (e.g., via control circuitry 304 (FIG. 3)) determine whether the portion corresponds to the media content by cross-referencing the portion (e.g., a screenshot of the media asset) with a database (e.g., located at storage 308 (FIG. 3) and/or any location accessible via communications network 414 (FIG. 4)) of portions (e.g., screenshots) of the media content to determine whether the portion matches one of the portions.

If the media guidance application (e.g., via control circuitry 304 (FIG. 3)) determines that the extracted data corresponds to media content stored in the database, the media guidance application may transmit the verification at step 610. For example, the media guidance application may (e.g., via control circuitry 304 (FIG. 3)) transmit a short message (e.g., for display on display 312 (FIG. 3)) declaring the media guidance data as verified or otherwise graphically accentuate verified media guidance data (e.g., presenting verified media guidance data in a different color). If the media guidance application determines that the extracted data does not correspond to media content stored in the database, the media guidance application proceeds to step 612.

At step 608, the media guidance application (e.g., via control circuitry 304 (FIG. 3)) determines whether an object in the extracted data corresponds to an object in the media content associated with the media guidance data. For example, as explained above, the media guidance application may (e.g., via control circuitry 304 (FIG. 3)) compare an object from the transmitted media asset (e.g., media asset 122 (FIG. 1)) to other objects that are found in media content known to be associated with the media guidance data to determine whether the transmitted media asset corresponds to the transmitted media guidance data (e.g., media guidance datum 112 (FIG. 1)). For example, the media guidance application may determine whether an object corresponds to the media content by cross-referencing the object (e.g., a character in the media asset) with a database (e.g., located at storage 308 (FIG. 3) and/or any location accessible via communications network 414 (FIG. 4)) of objects (e.g., characters) associated with media content known to correspond to the media guidance data.

If the media guidance application (e.g., via control circuitry 304 (FIG. 3)) determines that the object corresponds an object in the media content known to be associated with the media guidance data, the media guidance application may transmit the verification at step 614. For example, the media guidance application may transmit a short message declaring the media guidance data as verified or otherwise graphically accentuate verified media guidance data (e.g., presenting verified media guidance data in a different color). If the media guidance application (e.g., via control circuitry 304 (FIG. 3)) determines that the object does not correspond to an object in the media content known to be associated with media guidance data, the media guidance application proceeds to step 616.

At step 616, the media guidance application (e.g., via control circuitry 304 (FIG. 3)) retrieves (e.g., from media guidance data source 418 and/or any location accessible via communications network 414 (FIG. 4)) updated media guidance data. For example, in response to determining that the transmitted media guidance data is incorrect, the media guidance application may (e.g., via control circuitry 304 (FIG. 3)) search for different media guidance data. In some embodiments, searching for different media guidance data may involve finding different sources of media guidance data. For example, in response to determining that the media guidance data from a first source (e.g., media guidance data source 418 (FIG. 4)) is incorrect, the media guidance application may search for media guidance data from a second source (e.g., a different source of media guidance data accessible via communications network 414 (FIG. 4)).

At step 618, the media guidance application (e.g., via control circuitry 304 (FIG. 3)) transmits the updated media guidance data. For example, the media guidance application may populate a display screen (e.g., display 100 (FIG. 1)) with the updated media guidance data. Additionally or alternatively, the media guidance application may notify the user that the media guidance data has been updated. For example, the media guidance application may generate for display a pop-up message indicating which media guidance datum has been change.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of verifying media guidance data appearing in interactive guides by facilitating extraction and transmission of excerpts of media assets that are associated with media guidance data such that content of the excerpts may be compared to content known to be associated with the media guidance data, the method comprising:
   transmitting, from a server, a media asset for display on a user device;
   transmitting, from the server, a program listing for display on the user device;
   receiving an indication from a user that the program listing generated for display on the user device does not correspond to the media asset generated for display on the user device;
   in response to receiving the indication, determining, at the server, whether a portion of data extracted from the media asset generated for display on the user device corresponds to media content corresponding to the program listing generated for display on the user device by cross-referencing the portion with a database of portions of the media content to determine whether the portion matches one of the portions; and
   in response to determining that the portion of data extracted from the media asset does correspond to the media content corresponding to the program listing, displaying, on the user device, verified media guidance data, wherein the verified media guidance data is presented in a different color than unverified media guidance data.

2. The method of claim 1, wherein the portion corresponds to a scene, chapter, or frame of the media asset.

3. The method of claim 1, further comprising querying the user to determine whether to verify the media guidance data.

4. The method of claim 1, wherein the user device extracts the portion from the media asset generated for display on the user device and transmits the portion to the server.

5. The method of claim 1, further comprising requesting an additional portion of data extracted from the media asset generated for display on the user device in response to determining that the portion does not correspond to the media content.

6. The method of claim 1, further comprising transmitting a verification message in response to determining that the portion does correspond to the media content.

7. The method of claim 1, wherein the indication is transmitted in response to a user selecting an icon generated for display on the server.

8. The method of claim 1, wherein the indication is transmitted in response to a user selecting an icon generated for display on a third device.

9. The method of claim 1, wherein the portion includes audio and video data for the media asset.

10. The method of claim 1, wherein the program listing indicates a title, schedule, or description of the media asset.

11. A server for verifying media guidance data appearing in interactive guides by facilitating extraction and transmission of excerpts of media assets that are associated with media guidance data such that content of the excerpts may be compared to content known to be associated with the media guidance data, the server comprising:
    storage circuitry configured to store a media asset for transmission to a user device; and
    control circuitry configured to:
        transmit the media asset for display on a user device;
        transmit a program listing for display on the user device;
        receive an indication from a user that the program listing generated for display on the user device does not correspond to the media asset generated for display on the user device;
        in response to receiving the indication, determine, at the server, whether a portion of data extracted from the media asset generated for display on the user device corresponds to media content corresponding to the program listing generated for display on the user device by cross-referencing the portion with a database of portions of the media content to determine whether the portion matches one of the portions; and
        in response to determining that the portion of data extracted from the media asset does correspond to the media content corresponding to the program listing, transmit verified media guidance data for display on the user device, wherein the verified media guidance data is presented in a different color than unverified media guidance data.

12. The server of claim 11, wherein the portion corresponds to a scene, chapter, or frame of the media asset.

13. The server of claim 11, further comprising querying the user to determine whether to verify the media guidance data.

14. The server of claim 11, wherein the user device extracts the portion from the media asset generated for display on the user device and transmits the portion to the server.

15. The server of claim 11, wherein the control circuitry is further configured to request an additional portion of data extracted from the media asset generated for display on the user device in response to determining that the portion does not correspond to the media content.

16. The server of claim 11, wherein the control circuitry is further configured to transmit a verification message in response to determining that the portion does correspond to the media content.

17. The server of claim 11, wherein the indication is transmitted in response to a user selecting an icon generated for display on the server.

18. The server of claim 11, wherein the indication is transmitted in response to a user selecting an icon generated for display on a third device.

19. The server of claim 11, wherein the portion includes audio and video data for the media asset.

20. The server of claim 11, wherein the program listing indicates a title, schedule, or description of the media asset.

21. A method of verifying media guidance data, the method comprising:
    transmitting, from a server, a media asset for display on a user device;
    transmitting, from the server, a program listing for display on the user device;
    receiving an indication from a user that the program listing generated for display on the user device does not correspond to the media asset generated for display on the user device;
    in response to receiving the indication:
        extracting data from the media asset;
        cross-referencing, at the server, the extracted data with a database of media content to determine whether the extracted data matches media content corresponding to the program listing generated for display on the user device; and
    in response to determining that the extracted data from the media asset does match the media content corresponding to the program listing, display, on the user device, verified media guidance data, wherein the verified media guidance data is presented in a different color than unverified media guidance data.

22. A server for verifying media guidance data, the server comprising:
    storage circuitry configured to store a media asset for transmission to a user device; and
    control circuitry configured to:
        transmit the media asset for display on the user device;
        transmit a program listing for display on the user device;
        receive an indication from a user that the program listing generated for display on the user device does not correspond to the media asset generated for display on the user device;
        in response to receiving the indication:
            extract data from the media asset;
            cross-reference the extracted data with a database of media content to determine whether the extracted data matches media content corresponding to the program listing generated for display on the user device; and
        in response to determining that the extracted data from the media asset does match the media content corresponding to the program listing, transmit verified media guidance data for display on the user device, wherein the verified media guidance data is presented in a different color than unverified media guidance data.

* * * * *